Feb. 4, 1964     J. O. SHELTON     3,120,406
VENTILATED CUSHION
Filed Oct. 30, 1961
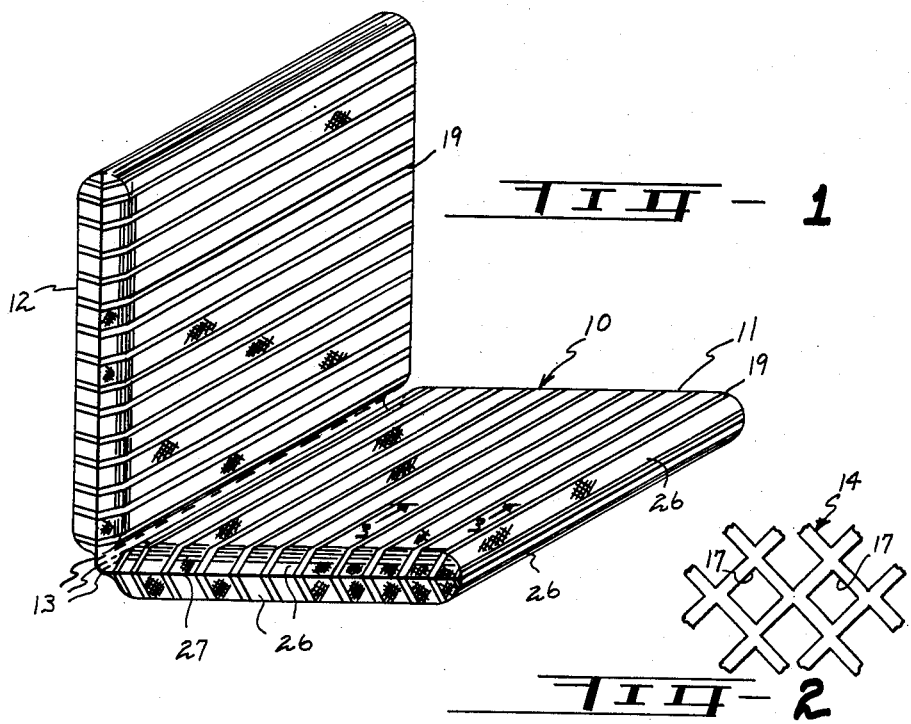
Fig. 1
Fig. 2
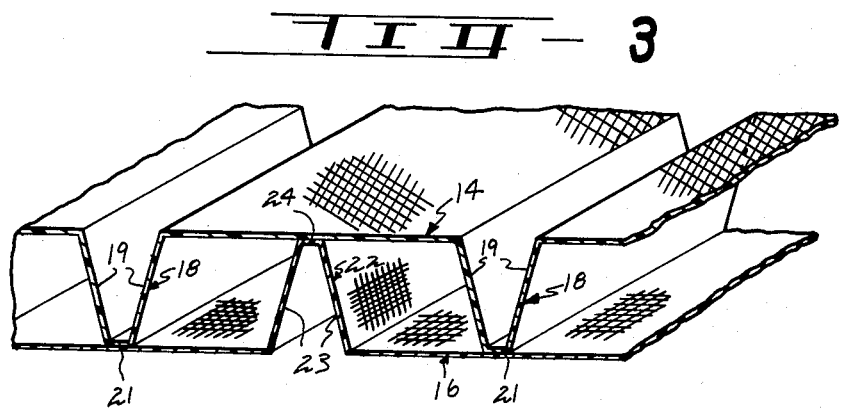
Fig. 3
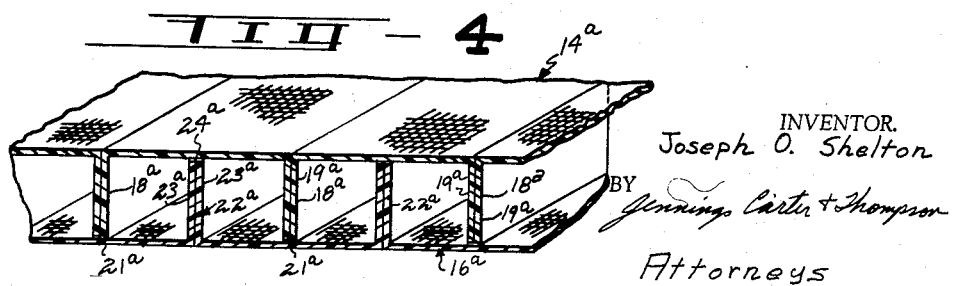
Fig. 4
INVENTOR.
Joseph O. Shelton
BY Jennings, Carter + Thompson
Attorneys 3,120,406
VENTILATED CUSHION
Joseph O. Shelton, Birmingham, Ala., assignor to Plastics Continental, a partnership composed of J. L. Thomas and Joseph O. Shelton, Birmingham, Ala.
Filed Oct. 30, 1961, Ser. No. 148,535
9 Claims. (Cl. 297—453)

This invention relates to a ventilated cushion and more particularly to a cushion adapted for use with a vehicle seat to provide free circulation of air between the seat of a vehicle and a person seated thereon.

An object of my invention is to provide a ventilated cushion adapted for use with a vehicle seat which shall have no wire or spring parts, thereby preventing damage to the vehicle seat and the clothing of the passenger and at the same time providing a rust-proof cushion.

Another object of my invention is to provide a ventilated cushion of the character designated which shall be light in weight and yet strong and durable.

A further object of my invention is to provide a ventilated cushion of the character designated which shall be adapted for construction from a material which does not absorb odors, dirt or moisture, thereby increasing the life of the cushion and maintaining the cushion and the clothes of a person seated thereon in a clean condition at all times.

A still further object of my invention is to provide a ventilated cushion of the character designated which shall be simple of construction, economical of manufacture and one which is comfortable in use due to the fact that it conforms to the contour of the body of the user.

As is well known in the art to which my invention relates, various forms of ventilated cushions have been devised for drivers of vehicles, such as buses, trucks and automobiles. However, such ventilated cushions have usually embodied a continuous mass of spring-like wire members which are covered by a suitable fabric. After the cushions have been in use for a short length of time, the fabric becomes worn or deteriorates rapidly due to its constant contact with perspiration from the body of the user. Accordingly, the wire members often become rusted and break, thereby damaging the clothing of the user and the seat of the vehicle. A further disadvantage encountered with conventional type ventilated cushions has been the fact that the wire spring members often become distorted whereby excessive wear is imparted to local areas thereof, thereby not only increasing the wear at these points but also making the cushion uncomfortable.

Briefly, my improved ventilated cushion comprises a pair of layers of expanded plastic-like material having open mesh vent openings therein. A series of inwardly projecting sections are formed integrally with each layer of material with the inwardly projecting sections of one layer of material being disposed between the adjacent inwardly projecting sections of the other layer of material. The layers of material are secured to each other whereby relative movement between the adjacent sections is limited and at the same time free ventilation is provided between the layers of material.

Ventilated cushions embodying features of my invention are illustrated in the accompanying drawing, forming a part of this application, in which:

FIG. 1 is an isometric view of my improved ventilated cushion;

FIG. 2 is an enlarged fragmental view showing the expanded plastic-like material from which my improved cushion is formed;

FIG. 3 is an enlarged, fragmental view taken generally along the line 3—3 of FIG. 1 showing the relationship of the layers of expanded plastic-like material relative to each other; and, FIG. 4 is a fragmental view showing a modified form of my invention.

Referring now to the drawing for a better understanding of my invention, I show my improved ventilated cushion generally at 10. The cushion comprises a seat portion 11 and a back portion 12 connected to each other by a series of scored lines 13 whereby the overall fold lines of the cushion define a uniform radius of curvature.

The cushion comprises a pair of layers of expanded plastic-like material indicated at 14 and 16. As clearly shown in FIG. 2, the material from which the layers of material 14 and 16 are formed are of an open mesh to provide relatively large vent openings 17 throughout the entire area of the layers of material 14 and 16.

As shown in FIG. 3, the layer of material 14 is provided with a series of inwardly projecting sections 18 which are defined by inwardly converging web members 19 which extend transversely of the seat and back portions, as shown in FIGS. 1 and 3. The web members 19 of each inwardly projecting section 18 are joined to a relatively flat portion 21 which in turn engages the inner surface of the layer of material 16.

In like manner, the layer of expanded material 16 is provided with inwardly projecting sections 22 defined by inwardly converging web members 23. As shown in FIG. 3, the web members 23 extend transversely of the cushion and terminate in relatively flat portions 24 adjacent the inner surface of the sheet of material 14. Preferably, the flat portions 21 and 24 are secured to the adjacent inner surfaces of the layers of material 16 and 14, respectively. It will be noted that the inwardly projecting sections 18 are disposed between adjacent inwardly projecting sections 22 while each inwardly projecting section 22 is disposed between adjacent inwardly projecting sections 18. Accordingly, a sturdy construction is provided which maintains the layers of expanded material 14 and 16 in spaced relation to each other whereby free ventilation of air is permitted therebetween.

As shown in FIG. 1, the peripheral edges of the layers of expanded material 14 and 16 are curved inwardly toward each other as at 26 and are secured to each other along a line 27. Accordingly, a smooth peripheral edge is provided for the entire cushion 10 and at the same time, the overall strength of the cushion is greatly increased.

Referring now to FIG. 4 of the drawing, I show a modified form of my invention in which layers of expanded plastic material 14$^a$ and 16$^a$ are provided. The layer of expanded material 14$^a$ is bent on itself at intervals to provide inwardly projecting sections 18$^a$. Each inwardly projecting section 18$^a$ thus comprises a pair of parallel web members 19$^a$ which extend generally perpendicular to the layers of material 14$^a$ and 16$^a$. Each inwardly projecting section 18$^a$ is secured to the adjacent inner surface of the layer of material 16$^a$ as at 21$^a$.

In like manner, the layer of expanded material 16$^a$ is provided with inwardly projecting sections 22$^a$, each of which comprise a pair of parallel web members 23$^a$. The web members 23$^a$ extend parallel to each other and are secured to the adjacent inner surface of the layer of material 14$^a$ as at 24$^a$. The inwardly projecting sections 18$^a$ and 22$^a$ extend transversely of the layers of material 14$^a$ and 16$^a$, as shown. That is, the structure shown in FIG. 4 is similar to that shown in FIG. 3, the principal difference being the fact that the web members for the layers of expanded plastic material extend parallel to each other rather than converging toward the point of connection with the adjacent sheet of material.

From the foregoing, it will be seen that I have devised an improved ventilated cushion which is sturdy of construction and one which will not be distorted after extended use. Also, by forming the ventilated cushion of an expanded plastic-like material whereby relatively large openings are provided therein, free ventilation of air is permitted between the layers of material. Also, in view of the fact that the cushion is self-supporting without the necessity of having to provide spring-like wire members therein, more space is provided for free circulation of air through the cushion. Furthermore, by securing the rounded peripheral edges of the cushion to each other and providing the scored connecting portions between the back and seat portions, the strength of the cushion is greatly increased and at the same time the back and seat portion of the cushion are adapted for free pivotal movement relative to each other.

While I have shown my invention in two forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. A ventilated cushion comprising a first layer of perforated sheet material having inwardly projecting sections formed integrally therewith and extending transversely thereof, a second layer of perforated sheet material having inwardly projecting sections formed integrally therewith and extending transversely thereof inwardly between adjacent ones of said inwardly projecting sections formed integrally with said first layer, and means securing said first layer of material to said second layer of material.

2. A ventilated cushion as defined in claim 1 in which the inwardly projecting sections of said first layer of material are secured to the adjacent inner surface of said second layer of material and the inwardly projecting sections of said second layer of material are secured to the adjacent inner surface of said first layer of material.

3. A ventilated cushion comprising a pair of layers of expanded plastic-like material having open mesh vent openings throughout substantially the entire area thereof, inwardly projecting sections formed integrally with said pairs of layers of material with the inwardly projecting sections of one layer of material being disposed between adjacent inwardly projecting sections of the other layer of material, and means securing said layers of material to each other.

4. A ventilated cushion as defined in claim 3 in which the inwardly projecting sections of one layer of material are secured to the inner surface of the other layer of material.

5. A ventilated cushion as defined in claim 3 in which each inwardly projecting section comprises a pair of inwardly converging web members connected to each other adjacent the point of juncture thereof with the inner surface of the layer of material adjacent thereto.

6. A ventilated cushion as defined in claim 3 in which each inwardly projecting section comprises a pair of inwardly extending web members substantially parallel to each other and normal to said layers of material.

7. A ventilated cushion as defined in claim 3 in which the cushion comprises a seat portion and a back portion connected to each other by a series of transverse scored lines whereby the fold lines of the cushion define a uniform radius of curvature.

8. A ventilated cushion as defined in claim 3 in which the edges of said layers of material are secured to each other.

9. A ventilated cushion as defined in claim 8 in which the portions of the cushion adjacent the peripheral edges thereof are rounded.

References Cited in the file of this patent

UNITED STATES PATENTS

| | | |
|---|---|---|
| 2,620,862 | Hite | Dec. 9, 1952 |
| 2,931,427 | Goldstein | Apr. 5, 1960 |
| 2,948,334 | Goldstein | Aug. 9, 1960 |